(12) United States Patent
Johnsen et al.

(10) Patent No.: US 9,332,005 B2
(45) Date of Patent: May 3, 2016

(54) SYSTEM AND METHOD FOR PROVIDING SWITCH BASED SUBNET MANAGEMENT PACKET (SMP) TRAFFIC PROTECTION IN A MIDDLEWARE MACHINE ENVIRONMENT

(75) Inventors: Bjørn Dag Johnsen, Oslo (NO); David Brean, Boston, MA (US); Ola Tørudbakken, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/545,803

(22) Filed: Jul. 10, 2012

(65) Prior Publication Data

US 2013/0019303 A1    Jan. 17, 2013

Related U.S. Application Data

(60) Provisional application No. 61/506,557, filed on Jul. 11, 2011, provisional application No. 61/645,517, filed on May 10, 2012.

(51) Int. Cl.
*H04L 29/06* (2006.01)
*H04L 12/24* (2006.01)

(52) U.S. Cl.
CPC .......... *H04L 63/083* (2013.01); *H04L 41/0803* (2013.01); *H04L 63/0227* (2013.01); *H04L 63/0236* (2013.01); *G06F 2221/2141* (2013.01); *H04L 63/162* (2013.01)

(58) Field of Classification Search
None
See application file for complete search history.

(56) References Cited

U.S. PATENT DOCUMENTS

| | | | |
|---|---|---|---|
| 5,758,083 A | 5/1998 | Singh et al. | |
| 6,012,100 A | 1/2000 | Frailong | |
| 6,038,233 A | 3/2000 | Hamamoto et al. | |
| 6,098,098 A | 8/2000 | Sandahl et al. | |
| 6,148,336 A | 11/2000 | Thomas et al. | |
| 6,282,678 B1 | 8/2001 | Snay | |
| 6,286,038 B1 | 9/2001 | Reichmeyer | |
| 6,308,148 B1 | 10/2001 | Bruins et al. | |

(Continued)

FOREIGN PATENT DOCUMENTS

| | | |
|---|---|---|
| EP | 1 128 607 A2 | 8/2001 |
| EP | 2160068 A1 | 3/2010 |
| WO | 2012037518 | 3/2012 |

OTHER PUBLICATIONS

International Search Report dated Sep. 23, 2013 for Application No. PCT/US2013/040639, 10 pages.

(Continued)

*Primary Examiner* — Hadi Armouche
*Assistant Examiner* — Malcolm Cribbs
(74) *Attorney, Agent, or Firm* — Tucker Ellis LLP

(57) ABSTRACT

A system and method can provide switch based subnet management packet (SMP) traffic protection in a middleware machine environment. The middleware machine environment includes a network switch that operates to receive at least one SMP destined for a subnet management agent (SMA). The network switch can check whether the at least one SMP includes a correct management key, and prevent the at least one SMP from being forwarded to the destined SMA when at least one SMP does not include the correct management key. Furthermore, the network switch can specify a different management key for each external port and can enforce separate restrictions on ingress and egress SMP traffic at a particular external port.

20 Claims, 3 Drawing Sheets

(56) References Cited

U.S. PATENT DOCUMENTS

| | | |
|---|---|---|
| 6,314,531 B1 | 11/2001 | Kram |
| 6,343,320 B1 | 1/2002 | Fairchild et al. |
| 6,658,579 B1 | 12/2003 | Bell et al. |
| 6,697,360 B1 | 2/2004 | Gai |
| 6,772,320 B1 | 8/2004 | Raj |
| 6,826,694 B1 | 11/2004 | Dutta et al. |
| 6,941,350 B1 | 9/2005 | Frazier |
| 6,981,025 B1 | 12/2005 | Frazier et al. |
| 7,023,795 B1 | 4/2006 | Hwu |
| 7,113,995 B1 * | 9/2006 | Beukema et al. ............ 709/229 |
| 7,290,277 B1 | 10/2007 | Chou et al. |
| 7,398,394 B1 | 7/2008 | Johnsen et al. |
| 7,409,432 B1 | 8/2008 | Recio et al. |
| 7,636,772 B1 | 12/2009 | Kirby et al. |
| 7,721,324 B1 * | 5/2010 | Jackson ............................ 726/4 |
| 7,792,987 B1 | 9/2010 | Vohra |
| 7,843,906 B1 | 11/2010 | Chidambaram et al. |
| 7,860,006 B1 * | 12/2010 | Kashyap et al. ............ 370/235 |
| 7,894,440 B2 | 2/2011 | Xu et al. |
| 8,054,832 B1 | 11/2011 | Shukla et al. |
| 8,149,834 B1 | 4/2012 | Nielsen |
| 8,391,289 B1 | 3/2013 | Yalagandula |
| 8,645,524 B2 | 2/2014 | Pearson |
| 2002/0016858 A1 * | 2/2002 | Sawada et al. ............... 709/238 |
| 2002/0133620 A1 | 9/2002 | Krause |
| 2003/0005039 A1 | 1/2003 | Craddock |
| 2003/0051026 A1 | 3/2003 | Carter |
| 2004/0013088 A1 | 1/2004 | Gregg |
| 2004/0028047 A1 * | 2/2004 | Hou et al. ..................... 370/392 |
| 2004/0037279 A1 | 2/2004 | Zelig et al. |
| 2004/0078709 A1 | 4/2004 | Beukema |
| 2004/0123142 A1 | 6/2004 | Dubal et al. |
| 2004/0168089 A1 * | 8/2004 | Lee ............................... 713/201 |
| 2005/0071709 A1 | 3/2005 | Rosenstock |
| 2005/0100033 A1 | 5/2005 | Arndt et al. |
| 2005/0163115 A1 | 7/2005 | Dontu |
| 2005/0198371 A1 | 9/2005 | Smith |
| 2006/0230219 A1 | 10/2006 | Njoku |
| 2007/0022479 A1 * | 1/2007 | Sikdar et al. .................. 726/22 |
| 2007/0038703 A1 | 2/2007 | Tendjoukian et al. |
| 2007/0073882 A1 | 3/2007 | Brown et al. |
| 2007/0140266 A1 | 6/2007 | Njoku |
| 2007/0162520 A1 | 7/2007 | Petersen et al. |
| 2007/0280104 A1 | 12/2007 | Miyoshi |
| 2008/0049764 A1 | 2/2008 | Solomon |
| 2008/0137528 A1 | 6/2008 | O'Toole et al. |
| 2008/0159277 A1 | 7/2008 | Vobbilisetty |
| 2008/0267183 A1 | 10/2008 | Arndt |
| 2008/0301256 A1 | 12/2008 | McWilliams et al. |
| 2009/0003317 A1 | 1/2009 | Kasralikar |
| 2009/0019505 A1 | 1/2009 | Gopalakrishnan et al. |
| 2009/0073895 A1 * | 3/2009 | Morgan et al. ............... 370/255 |
| 2009/0080328 A1 | 3/2009 | Hu et al. |
| 2009/0216910 A1 | 8/2009 | Duchesneau |
| 2009/0222558 A1 | 9/2009 | Xu et al. |
| 2009/0234974 A1 | 9/2009 | Arndt |
| 2009/0262741 A1 | 10/2009 | Jungck et al. |
| 2010/0008291 A1 | 1/2010 | LeBlanc et al. |
| 2010/0054129 A1 | 3/2010 | Kuik et al. |
| 2010/0103837 A1 | 4/2010 | Jungck et al. |
| 2010/0107162 A1 | 4/2010 | Edwards et al. |
| 2010/0118868 A1 | 5/2010 | Dabagh |
| 2010/0138532 A1 | 6/2010 | Glaeser et al. |
| 2010/0228961 A1 | 9/2010 | Burns |
| 2010/0257269 A1 | 10/2010 | Clark |
| 2010/0275199 A1 | 10/2010 | Smith et al. |
| 2010/0287548 A1 | 11/2010 | Zhou et al. |
| 2010/0306408 A1 | 12/2010 | Greenberg et al. |
| 2011/0023108 A1 | 1/2011 | Geldermann et al. |
| 2011/0131447 A1 | 6/2011 | Prakash et al. |
| 2011/0239268 A1 | 9/2011 | Sharp et al. |
| 2011/0246669 A1 | 10/2011 | Kanada et al. |
| 2011/0268117 A1 | 11/2011 | Davis |
| 2011/0299537 A1 | 12/2011 | Saraiya |
| 2011/0317703 A1 | 12/2011 | Dunbar et al. |
| 2012/0103837 A1 | 5/2012 | Wall et al. |
| 2012/0131225 A1 | 5/2012 | Chiueh et al. |
| 2012/0147894 A1 | 6/2012 | Mulligan et al. |
| 2012/0173757 A1 | 7/2012 | Sanden |
| 2012/0265976 A1 | 10/2012 | Spiers et al. |
| 2012/0278804 A1 | 11/2012 | Narayanasamy et al. |
| 2012/0291028 A1 | 11/2012 | Kidambi et al. |
| 2012/0307826 A1 | 12/2012 | Matsuoka |
| 2012/0314706 A1 | 12/2012 | Liss et al. |
| 2012/0320929 A9 | 12/2012 | Subramanian et al. |
| 2012/0331127 A1 | 12/2012 | Wang et al. |
| 2012/0331142 A1 | 12/2012 | Mittal et al. |
| 2013/0036136 A1 | 2/2013 | Horii |
| 2013/0077492 A1 | 3/2013 | Scaglione |
| 2013/0232492 A1 | 9/2013 | Wang |
| 2014/0115584 A1 | 4/2014 | Mudigonda et al. |
| 2014/0223431 A1 | 8/2014 | Yoshimura et al. |

OTHER PUBLICATIONS

Lee, M. et al., "Security Enhancement in Infiniband Architecture," Proceedings of the 19th IEEE International Parallel and Distributed Processing Symposium, Denver, Colorado, Apr. 4-8, 2005, Piscataway, New Jersey, Apr. 4, 2005, 18 pages.

Sun Infiniband Dual Port 4x QDR PCIe ExpressModule and Low Profile Host Channel Adapters M2, Frequently Asked Questions, Sep. 21, 2010, http://www.oracle.com/us/products/servers-storage/networking/infiniband/sun-qdr-ib-hcas-faq-172841.pdf, retrieved on Sep. 11, 2012, 4 pages.

International Search Report dated Sep. 26, 2013 for Application No. PCT/US2013/040656, 10 pages.

European Patent Office, International Searching Authority, International Search Report and Written Opinion dated Oct. 11, 2012 for Application No. PCT/US2012/046225, 11 pages.

European Patent Office, International Searching Authority, International Search Report and Written Opinion dated Nov. 30, 2012 for Application No. PCT/US2012/046219, 18 pages.

* cited by examiner

SYSTEM AND METHOD FOR PROVIDING SWITCH BASED SUBNET MANAGEMENT PACKET (SMP) TRAFFIC PROTECTION IN A MIDDLEWARE MACHINE ENVIRONMENT

CLAIM OF PRIORITY

This application claims priority to U.S. Provisional Patent Application No. 61/506,557, entitled "SYSTEM AND METHOD FOR USING UNICAST AND MULTICAST FLOODING MECHANISMS TO PROVIDE EoIB GATEWAY vNICs" filed Jul. 11, 2011, and U.S. Provisional Patent Application No. 61/645,517, entitled "SYSTEM AND METHOD FOR PROVIDING SECRET MANAGEMENT KEY IN A MIDDLEWARE MACHINE ENVIRONMENT" filed May 10, 2012, which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent application, which is hereby incorporated by reference in its entirety:
U.S. patent application Ser. No. 13/545,796, entitled "SYSTEM AND METHOD FOR SUPPORTING SUBNET MANAGEMENT PACKET (SMP) FIREWALL RESTRICTIONS IN A MIDDLEWARE MACHINE ENVIRONMENT", inventors Bjorn Dag Johnsen, Roy Arntsen and Lars Paul Huse, filed Jul. 10, 2012.

FIELD OF INVENTION

The present invention is generally related to computer systems and software such as middleware, and is particularly related to supporting a middleware machine environment.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Tex. Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein are systems and methods for providing switch based subnet management packet (SMP) traffic protection in a middleware machine environment. The middleware machine environment includes a network switch that operates to receive at least one SMP destined for a subnet management agent (SMA) components. The network switch can check whether the at least one SMP includes a correct management key, and prevent the at least one SMP from being forwarded to the destined SMA when at least one SMP does not include the correct management key. Furthermore, the network switch can specify a different management key for each external port and can enforce separate restrictions on ingress and egress SMP traffics at a particular external port.

DETAILED DESCRIPTION

Described herein is a system and method for providing a middleware machine or similar platform. In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

M_Key Protection Model

Figure 1:
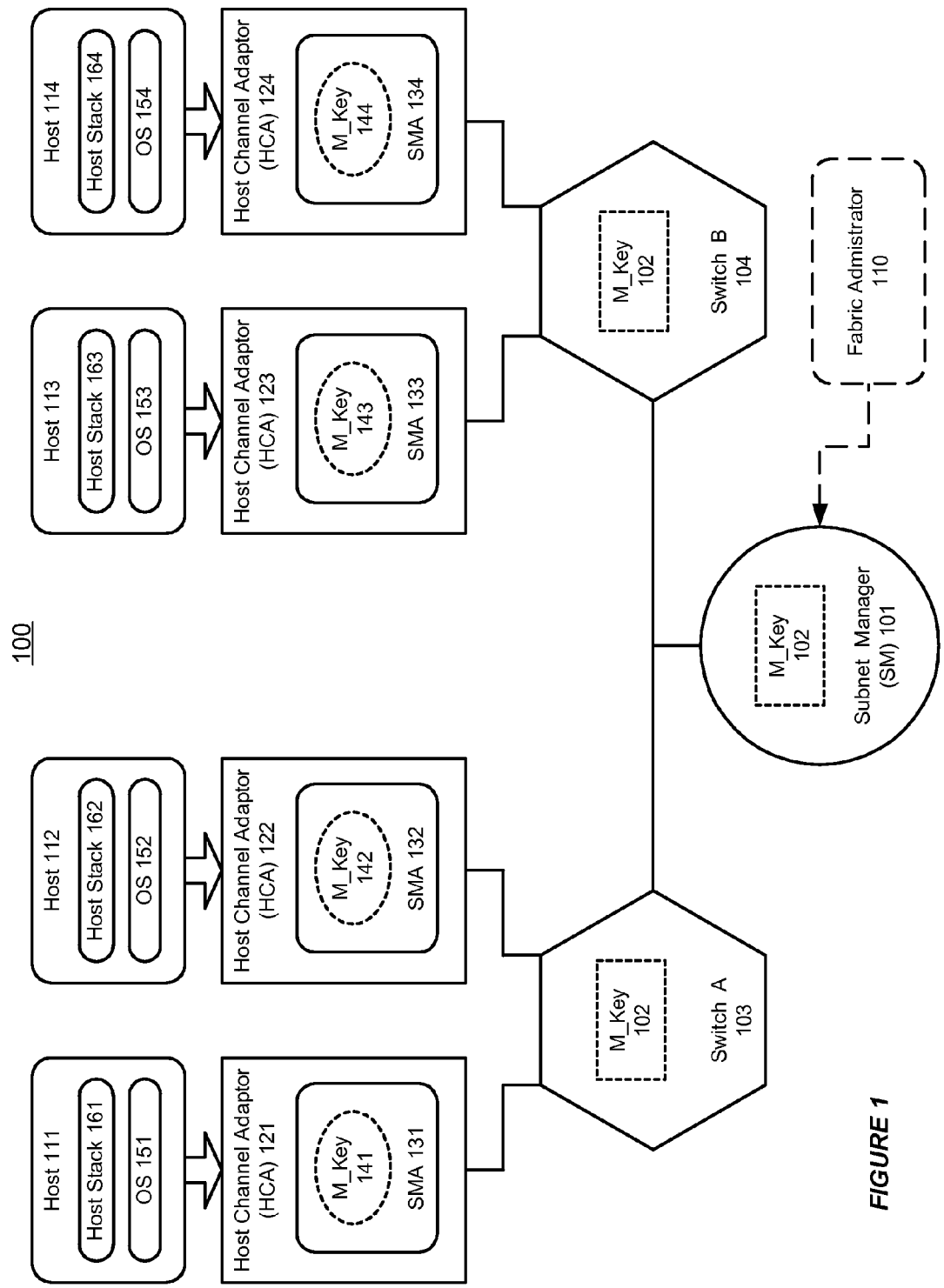
FIG. 1 shows an illustration of supporting a management key protection model in a middleware machine platform, in accordance with an embodiment of the invention.

FIG. 1 shows an illustration of supporting a management key protection model in a middleware machine platform, in accordance with an embodiment of the invention. As shown in FIG. 1, a management key, such as an M_Key 102, can be used to protect an IB fabric (or an IB subnet) 100. The values for the M_Key 102 may only be known by fabric administrators 110, which can have administrator access to the switches 103-104 and the designated subnet manager (SM) nodes 101 in the IB subnet/fabric 100. The integrity of the M_Key(s) 102 depends on the integrity of the fabric level administration passwords used by the fabric administrators 110, as well as the physical access protection of the switches 103-104 in the IB subnet/fabric 100, e.g. in a data center.

In the IB fabric 100, a secure HCA firmware implementation in HCA 121-124 can keep the type and identity of various fabric nodes well defined. Each of the HCA 121-124 can implement a subnet management agent (SMA) components 131-134, each of which can be associated with an M_Key 141-144. Furthermore, the connected switches A-B 103-104 can be controlled by the fabric administrator 110. Thus, any rogue SMA implementation 131-134 may not compromise the fabric administrator 110 defined M_Key 102 values that are used in the IB subnet/fabric 100.

Additional descriptions of various embodiments of using secure HCA firmware implementation in a middleware machine platform are provided in U.S. patent application Ser. No. 13/487,973, entitled "SYSTEM AND METHOD FOR PROVIDING SECURE SUBNET MANAGEMENT AGENT (SMA) IN AN INFINIBAND (IB) NETWORK", filed Jun. 4, 2012, which application is herein incorporated by reference.

Furthermore, the fabric administrator 110 can ensure that new M_Key values 102 for the IB subnet/fabric 100 are installed out-of-band on switches 103-104 (as well as for the relevant subnet manager instances 101). Additionally, the fabric administrator 110 can ensure that there is infinite M_Key 102 lease time on the switches 103-104. Thus, the host based software 161-164, e.g. a host based subnet manager on different hosts 111-114 (including an operating system 151-154), can not hijack the control of any switch 103-104 in the IB subnet/fabric 100.

In accordance with an embodiment of the invention, a single M_Key 102 value (or a single set of M_Key values) can be used for various nodes in the in the IB subnet/fabric 100 based on the IB specification defined access restrictions. The correct value for a current M_Key 102 may need to be specified before either reading or updating the M_Key 102, since the secure HCA firmware can ensure that the "read protected" M_Key assigned to the local HCA 121-124 is not exposed to local host based software.

Additionally, local software 161-164 on different hosts 111-114 may be able to hi-jack the HCA port by setting up its own M_Key value, in the case when the current M_Key value for HCA ports is defined at run-time. Also, the host local software 161-164 may make the HCA port unmanageable for the designated subnet manager 101, e.g., before the designated subnet manager 101 sets up any M_Key 102 for the HCA 121-124.

In accordance with an embodiment of the invention, a designated subnet manager 101 can ignore any HCA ports with un-known M_Key value and leave the corresponding link not initialized. The only impact of a hijacked HCA port M_Key can be that the HCA port may not be operational, and the designated subnet manager 101 can prevent host based software from communicating via this HCA port using normal communication, i.e. non-SMP/VL15 based communication.

Furthermore, when host software 111-114 compromises the local HCA M_Key value, the offending host software may be able to bring the HCA port to an operational state with activated local identifiers (LIDs) and partition membership. In such a case, if the switch port on a switch 103-104 that connects to the HCA 121-124 is controlled by a different M_Key value that is not known to the host software 111-114 that has compromised the local HCA M_Key value, then the offending host software 111-114 may not be able to bring the link to a full operational state that allows normal data traffic.

In accordance with an embodiment of the invention, the IB fabric 100 can prevent direct route SMPs between the various hosts 111-114 in order to avoid various potentially threatening scenarios. In one scenario, a host, e.g. host 111, can use the direct route SMPs to hijack the M_Key of the HCA port on a remote host, e.g. 112, after the remote host 112 and/or the remote HCA 122 are reset. This can cause the remote HCA 122 port to become inaccessible from the SM 101 and thereby prevent the remote host 112 from participating in normal IB communication, i.e. a denial of service (DoS) attack. In another scenario, when two hosts, e.g. host 111 and host 114, are compromised by hackers, the cooperating administration in the IB fabric 100 that depends on direct route SMPs may allow the two compromised hosts to exchange information using direct route SMPs.

The IB fabric 100 can support the cooperating administration for exchanging information between different hosts 111-114 without depending on direct route SMPs. For example, the administrators for the hosts can access a shared web-page on the Internet instead of relying on direct route SMPs in the IB fabric 100. From a fabric security perspective, leaving direct route SMPs as a security hole on the IB fabric may be considered a worse situation than allowing both host administrators to access a shared web-page on the Internet.

In accordance with an embodiment of the invention, the HCA ports may be set up with finite lease time on M_Keys 102, e.g. due to a high availability concern with the subnet manager(s) 101 that maintains the M_Key 102 lease period. Thus, the M_Keys 102 can expire without the associated link going down. Consequently, the state of the HCA 121-124, e.g. the partition membership, may be updated while links are still in active mode and the LID routes for the involved port are still operational. Then, the IB fabric 100 without M_Key protection may mistakenly allow normal IB traffic between a hi-jacked host and the hosts in other partitions.

Furthermore, if the M_Keys 102 expire before the links going down, both the local HCA, e.g. HCA 121, and any remote HCA, e.g. HCA 124, may be hi-jacked and the partition membership may be modified. If the associated switch ports, e.g. on switches 103-104, are not set up to perform partition enforcement, then the traffic with non-solicited partition membership can reach any other node in the fabric.

Additionally, a subnet manager 101 within the IB fabric 100 can depend on a designated virtual lane (VL), e.g. the VL15 buffering, in order to correctly monitor and control the IB fabric 100 and negotiate with other subnet managers in the IB fabric 100. Since the VL15 buffering within the IB fabric 100 is a shared resource, the uncontrolled use of SMPs from any host can represent a DoS attack. This can affect subnet manager 101 operations, since the M_Key protection within the IB fabric 100 may prevent the hosts from changing any SMA state on any node. Thus, there is a need to provide SMP traffic protection in the IB fabric 100.

In accordance with an embodiment of the invention, the M_Key 102 can be created and managed by fabric administrators 110 and stored in secured memory on switches A-B 103-104 and/or HCAs 121-124. A microprocessor on a switch A-B 103-104 or a HCA 121-124 can access the memory for reading out the M_Key 102 or writing the M_Key 102 into the memory.

Switch Based Proxy M_Key Protection

In accordance with an embodiment of the invention, M_Key checking of SMPs can be performed in intermediate switch nodes in an IB fabric to ensure that the local switch M_Key setting can protect remote HCA ports that do not have an M_Key set up.

Figure 2:
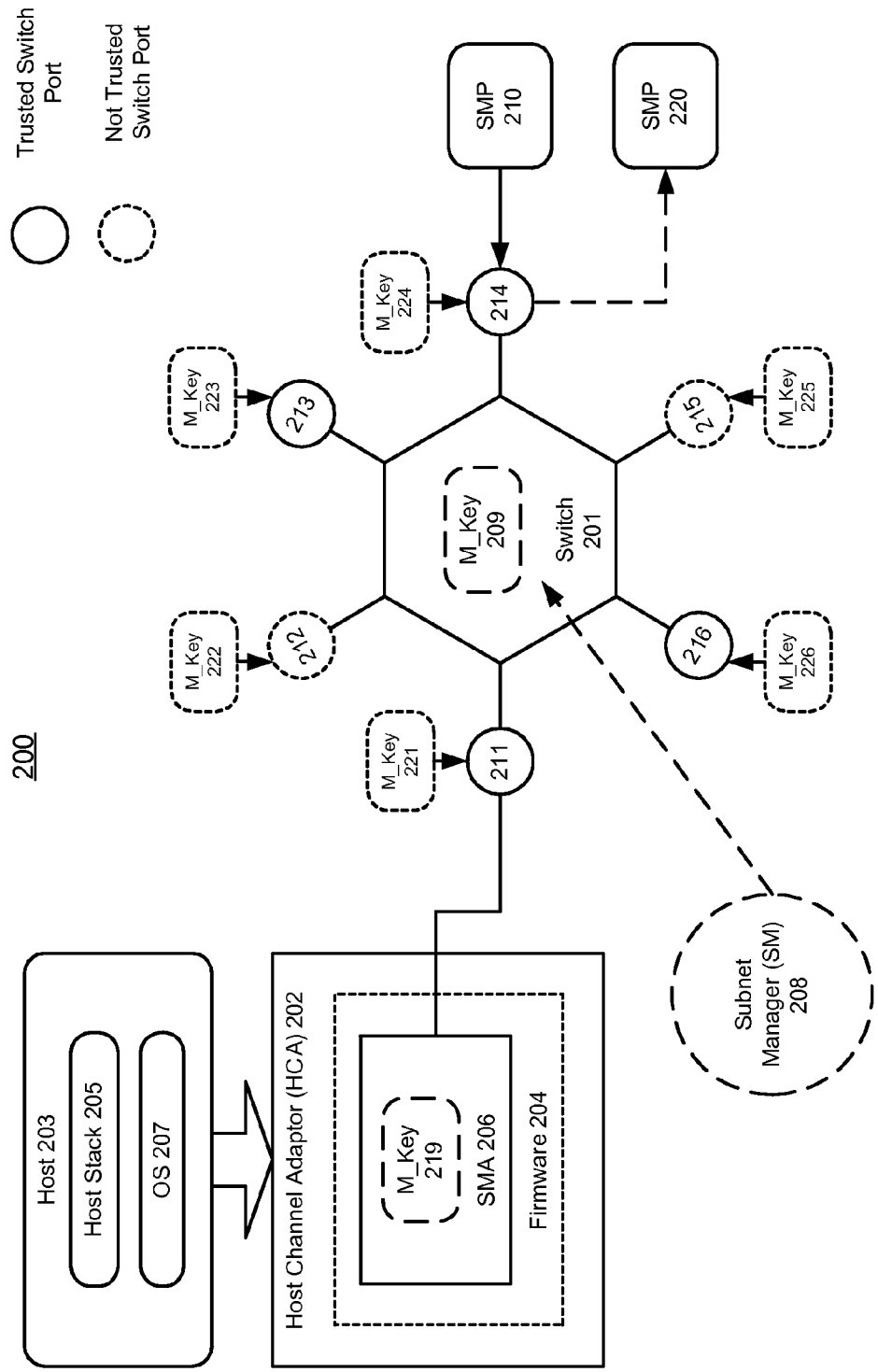
FIG. 2 shows an illustration of providing switch based SMP traffic protection in a middleware machine environment, in accordance with an embodiment of the invention.

FIG. 2 shows an illustration of providing switch based SMP traffic protection in a middleware machine environment, in accordance with an embodiment of the invention. As shown in FIG. 2, a middleware machine environment 200 can comprise an IB switch 201 that connects to a host 203 via a HCA 202. The host 203 can include a host stack software 205 running on top of an operating system 207. The IB switch 201 can include one or more switch ports 211-216, each of which can be used for connecting with separate nodes or entities in the IB fabric 200, e.g. switch port 211 is connected with the HCA 202.

A subnet management agent (SMA) component 206, which is implemented in firmware 204 on the HCA 202, can communicate with other nodes in the IB fabric 200 via the switch port 211. Also, the designated subnet manager 208 in the IB fabric 200 can use a particular switch port, e.g. port 211, for both sending direct route SMP requests to any SMA 206 and receiving direct route SMP responses from the SMA 206.

The switch 201 can prevent un-intended SMP traffic occurring in the IB fabric 200, without depending on requiring all HCAs to have trusted firmware with SMP control. For example, the switch 201 can filter direct route SMP traffic that is not consistent with a fabric policy for the IB fabric 200.

The switch 201 can use a filtering scheme to prevent a remote HCA port 202 from being hijacked by an intruder. The filtering scheme can be based on identifying any direct route SMP request that targets setting an SMA 206 attribute. Additionally, the filtering scheme can perform the same M_Key check for all direct route SMP requests independently of the destination, and may require that the direct route SMP requests include the correct M_Key 209 for the local switch 201 independently of which destination the SMP is targeting.

A single M_Key 209 can be used in an IB fabric 200, which includes the switch 201 and the HCA ports 202 that directly connects to the switch 201. If the host stack software 205 is able to compromise the M_Key 219 that protects the local HCA 202, then the host stack software 205 may also compromise the M_Key 209 protecting the local switch 201, since all SMP traffic in the IB fabric 200 includes the local switch M_Key 209.

In accordance with an embodiment of the invention, the switch 201 implementation can specify an optional M_Key value for each external port, e.g. M_Keys 221-226 for external ports 211-216. Additionally, the switch 201 implementation can ensure that any SMP sent out from a switch port, e.g. switch port 211, and any SMP received from this port all have an M_Key value that matches the M_Key 221 specified for the switch port 211. Furthermore, the network switch 201 can enforce separate restrictions on SMPs 220 sending from an external port 214 and SMPs 210 receiving at the external port 214.

Using this mechanism, a legitimate subnet manager 208 can ensure that all potentially untrusted remote HCA ports or other potentially untrusted remote ports may only be allowed to send out SMPs, when the correct local M_Key associated with a switch port is specified. Also, attempts to access a remote port may need to have the subnet manager 208 defined M_Key for that port independently of whether the remote port M_Key has been hi-jacked or not. Additionally, this mechanism can also specify an SMP rate that defines how fast the remote port can generate SMP, in order to prevent or reduce the chance of SMP based DoS attacks from an untrusted port in the fabric.

Additional descriptions of various embodiments of using SMP filtering in a middleware machine platform are provided in U.S. Pat. No. 7,398,394, entitled "SYSTEM AND METHOD FOR AUTHENTICATING NODES IN A COMMUNICATION NETWORK", filed Jun. 2, 2004 and issued Jul. 8, 2008, which application is herein incorporated by reference.

In accordance with an embodiment of the invention, a filtering scheme can prevent illegal host-host based direct route SMP traffic based on declaring the switch ports as either "trusted" or "not trusted." The determination of whether a switch port, or the entity connecting to the switch port, is trusted or not can be based on either explicit policy input to the local switch 201, or automatic authentication of the remote port.

As shown in FIG. 2, the switch ports 211, 213-214, and 216 are trusted switch ports, while the switch ports 212 and 215 are not trusted. The filtering scheme may only allow SMP requests to be sent from the trusted ports (egress from the switch), and SMP responses to be received by the trusted ports (ingress to the switch). Additionally, only SMA requests, which have entered the subnet from a trusted port in the first place, may be allowed for egress to un-trusted ports. Thus, the filtering scheme can be made independent of any current M_Key setting, and can also be used together with the above M_Key based filtering scheme.

In accordance with an embodiment of the invention, the ability to use a single M_Key 209, or a single set of M_Keys, throughout an IB subnet/fabric 200 depends on whether all nodes in the IB fabric 200 are trusted and do not expose the M_Key in use to any entity that does not have the required privileges. A pre-requisite for a subnet manager 208 to include the current M_Key in a request is that the subnet manager 208 can be assured that the target and any intermediate agent may not compromise the integrity of the M_Key. In one example, such trustfulness can be established prior to including the current M_Key in any SMP. Thus, the fabric configurations may require all nodes in the IB fabric, including the HCAs, to be authenticated (or declared) as trusted before any M_Key based communication can takes place, instead of assuming that all SMA instances are trustful a priori.

In accordance with an embodiment of the invention, a mechanism for sending and receiving vendor based SMPs via the switch management interface can be provided. Such a mechanism enables a switch embedded authentication mechanism to operate as part of the switch local software and thereby operate in concert with embedded subnet managers and the embedded switch driver and SMA stack.

Figure 3:
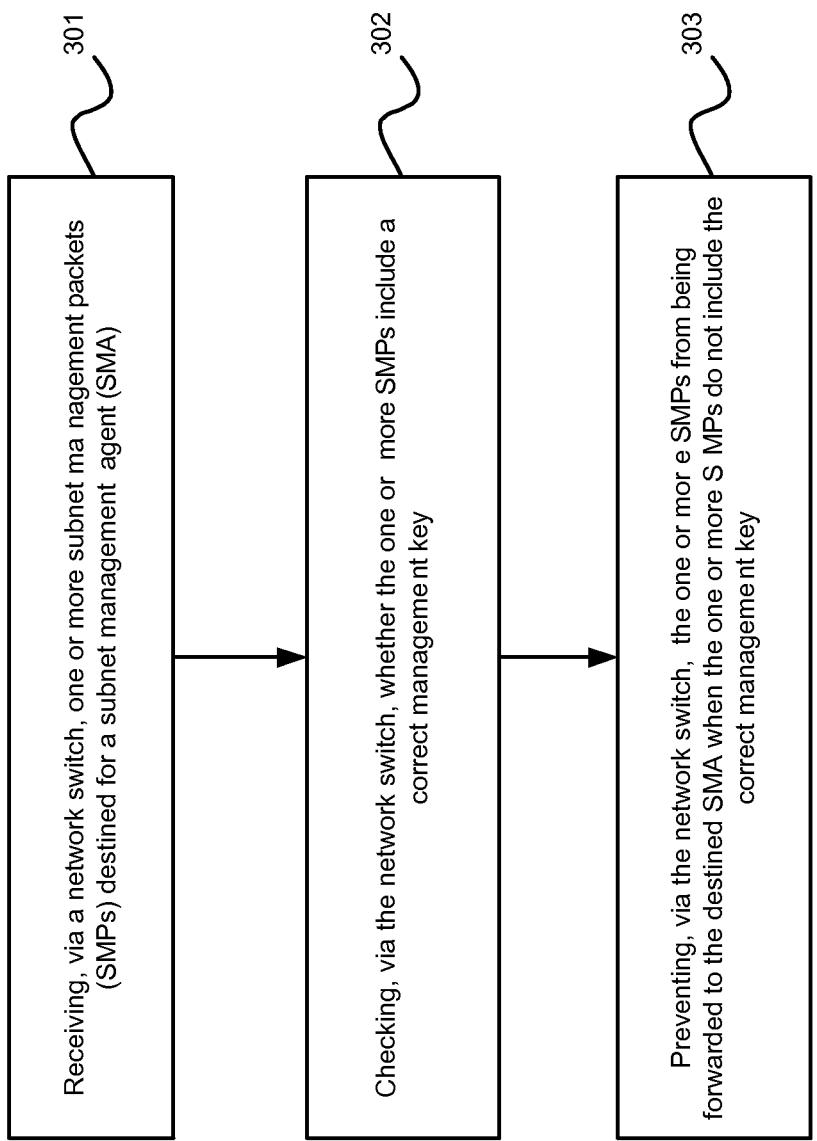
FIG. 3 illustrates an exemplary flow chart for providing switch based SMP traffic protection in a middleware machine environment, in accordance with an embodiment of the invention.

FIG. 3 illustrates an exemplary flow chart for providing switch based SMP traffic protection in a middleware machine environment, in accordance with an embodiment of the invention. As shown in FIG. 3, at step 301, a network switch can receive one or more SMPs destined for a subnet management agent (SMA). Then, at step 302, the network switch can check whether the one or more SMPs include a correct management key. Additionally, at step 303, the network switch can prevent the one or more SMPs from being forwarded to the destined SMA when the one or more SMPs do not include the correct management key.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for providing switch based subnet management packet (SMP) traffic protection in a middleware machine environment operable on one or more microprocessors, comprising:
   storing a defined management key value in a secured memory of a network switch;
   receiving, at the network switch, a plurality of SMPs destined for a subnet management agent (SMA);
   filtering the plurality of SMPs using the network switch by,
      checking, in the network switch, whether each of the plurality of SMPs includes a management key value which matches the defined management key value,
      forwarding from the network switch to the subnet management agent, each of the plurality of SMPs which includes a management key value which matches the defined management key value,
      blocking, using the network switch, each of the plurality of SMPs which includes a management key value which does not match the defined management key value, and
      enforcing separate restrictions on SMPs sent from an external port to the SMA and SMPs received at the external port from the SMA.

2. The method according to claim 1, further comprising: filtering the plurality of SMPs according to a fabric policy.

3. The method according to claim 2, further comprising: allowing each of the plurality of SMPs to be a direct route SMP.

4. The method according to claim 2, further comprising:
   allowing a subnet manager to use one or more SMPs to communicate with the subnet management agent (SMA) via a particular switch port on the network switch.

5. The method according to claim 1, wherein the network switch has a plurality of external ports, each associated with a different subnet the method further comprising:
   defining a different management key for each of the plurality of external ports.

6. The method according to claim 1, wherein enforcing separate restrictions on SMPs sent from an external port to the SMA and SMPs received at the external port from the SMA includes:
   preventing egress of an SMP via the external port if the external port is untrusted and the SMP was received from another untrusted external port but allowing egress of the SMP via the external port if the external port is untrusted and the SMP was received from a trusted external port.

7. The method according to claim 1, further comprising:
   ensuring, via a subnet manager, that a untrusted remote host channel adapter (HCA) associated with the SMA can only send out one or more SMPs when a correct management key value is specified.

8. The method according to claim 1, further comprising:
   specifying an SMP rate that defines how fast a remote HCA port is allowed to generate SMPs.

9. The method according to claim 1, further comprising:
   declaring one or more switch ports to be trusted and allowing
      SMP requests to be sent from the trusted ports, and
      SMP responses to be received at the trusted ports.

10. The method according to claim 9, further comprising:
    allowing only SMA requests to be sent to an untrusted port from the trusted ports.

11. A system for providing switch based subnet management packet traffic protection in a middleware machine environment, comprising:
    one or more microprocessors;
    a subnet management agent (SMA) component;
    a network switch running on said one or more microprocessors and having a secured memory, wherein the network switch operates to
       store a defined management key value in the secured memory;
       receive a plurality of SMPs destined for the subnet management agent (SMA); and
       filter the plurality of SMPs by,
          checking, whether each of the plurality of SMPs includes a management key value which matches the defined management key value,
          forwarding to the subnet management agent, each of the plurality of SMPs which includes a management key value which matches the defined management key value,
          blocking each of the plurality of SMPs which includes a management key value which does not match the defined management key value, and
          enforcing separate restrictions on SMPs sent from an external port to the SMA and SMPs received at the external port from the SMA.

12. The system according to claim 11, wherein:
    the plurality of SMPs are filtered according to a fabric policy.

13. The system according to claim 12, wherein:
each of the plurality of SMPs is a direct route SMP.

14. The system according to claim 12, further comprising:
a subnet manager which can use one or more SMPs to communicate with a subnet management agent (SMA) via a particular switch port on the network switch.

15. The system according to claim 11, wherein:
the network switch comprises a plurality of external ports; and
the network switch operates to store in the secured memory a different defined management key value for of the plurality of external ports on the network switch.

16. The system according to claim 11, wherein enforcing separate restrictions on SMPs sent from an external port to the SMA and SMPs received at the external port from the SMA includes:
preventing egress of an SMP via the external port if the external port is untrusted and the SMP was received from another untrusted external port but allowing egress of the SMP via the external port if the external port is untrusted and the SMP was received from a trusted external port.

17. The system according to claim 11, further comprising:
a subnet manager, which ensures that a untrusted remote host channel adapter (HCA) associated with the SMA can only send out a SMP when a correct management key value is specified.

18. The system according to claim 11, wherein:
the network switch operates to enforce an SMP rate which limits how fast a remote HCA port is allowed to generate SMPs.

19. The system according to claim 11, wherein:
the network switch comprises a plurality of trusted switch ports and the network switch allows
SMP requests to be sent from the trusted ports, and
SMP responses to be received at the trusted ports.

20. A non-transitory machine readable storage medium having instructions stored thereon for providing switch based subnet management packet (SMP) traffic protection in a middleware machine environment that when executed cause a system to perform steps comprising:
storing a defined management key value in a secured memory of a network switch;
receiving, at the network switch, a plurality of SMPs destined for a subnet management agent (SMA);
filtering the plurality of SMPs using the network switch by,
checking, in the network switch, whether each of the plurality of SMPs includes a management key value which matches the defined management key value,
forwarding from the network switch to the subnet management agent, each of the plurality of SMPs which includes a management key value which matches the defined management key value,
blocking, using the network switch, each of the plurality of SMPs which includes a management key value which does not match the defined management key value, and
enforcing separate restrictions on SMPs sent from an external port to the SMA and SMPs received at the external port from the SMA.

* * * * *